United States Patent
Katsuragi et al.

(10) Patent No.: US 6,394,594 B1
(45) Date of Patent: May 28, 2002

(54) INK, METHOD OF REDUCING KOGATION ON HEATER OF INK-JET RECORDING HEAD, INK-JET RECORDING PROCESS, INK-JET RECORDING APPARATUS, RECORDING UNIT, AND METHOD FOR LENGTHENING THE LIFE OF RECORDING HEAD

(75) Inventors: Ryuji Katsuragi; Makoto Shioya, both of Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/512,831

(22) Filed: Feb. 25, 2000

(30) Foreign Application Priority Data

Feb. 26, 1999 (JP) ............................. 11-050467

(51) Int. Cl.[7] ............................. G01D 11/00
(52) U.S. Cl. ....................... 347/100; 347/101
(58) Field of Search ................. 347/100, 101; 106/31–58

(56) References Cited

U.S. PATENT DOCUMENTS 4,990,939 A * 2/1991 Sekiya et al. ............... 347/100
5,062,892 A * 11/1991 Halko ........................ 106/31.58
5,609,671 A    3/1997 Nagasawa .................. 106/20 R

FOREIGN PATENT DOCUMENTS

| JP | 54-51837 | 4/1979 |
|---|---|---|
| JP | 3-160070 | 7/1991 |
| JP | 5-186704 | 7/1993 |
| JP | 8-3498 | 1/1996 |

OTHER PUBLICATIONS

Output Hardcopy Devices Book.*

* cited by examiner

Primary Examiner—John Barlow
Assistant Examiner—Manish S Shah
(74) Attorney, Agent, or Firm—Fitzpatrick, Cella, Harper & Scinto

(57) ABSTRACT

Disclosed herein is a method of reducing kogation on the surface of a heater for applying thermal energy to an ink to eject the ink from an orifice in an ink-jet printer having a recording head equipped with the heater, wherein the heater has an outermost protective layer comprising a metal and/or a metal oxide, and the ink comprises (a) a coloring material, (b) a liquid medium, and (c) at least one selected from the group consisting of polyol phosphates and salts thereof.

52 Claims, 3 Drawing Sheets

INK, METHOD OF REDUCING KOGATION ON HEATER OF INK-JET RECORDING HEAD, INK-JET RECORDING PROCESS, INK-JET RECORDING APPARATUS, RECORDING UNIT, AND METHOD FOR LENGTHENING THE LIFE OF RECORDING HEAD

BACKGROUND OF THE INVENTION

1. Field of the Invention

The present invention relates to an ink, a method of reducing kogation on the surface of a heater for applying thermal energy to an ink, an ink-jet recording process, an ink-jet recording apparatus, a recording unit, and a method for lengthening the life of an ink-jet recording head.

2. Related Background Art

Various systems have heretofore been proposed on printing using an ink-jet system. Among others, an ink-jet system (the so-called bubble-jet system) described in, for example, Japanese Patent Application Laid-Open No. 54-51837 or the like, in which an ink is ejected as ink droplets by the action of thermal energy, features that the formation of a high-density multi-orifice in a recording head can be realized with very ease, high-quality images can be provided at high speed and very low cost, and printing can also be conducted on plain paper having no special coating layer. According to this system, a heater of a recording head is rapidly heated, thereby generating bubbles in a liquid on the heater to cause a rapid volumetric increase of the liquid. A droplet of the liquid is ejected from an orifice of the recording head by the working force based on this rapid volumetric increase and applied to a recording medium, thereby conducting printing.

According to this system, however, a scorch deposition (the so-called kogation) of an ink may be built up on the surface of the heater in some cases as the result of the repeated heating of the heater of the recording head for ejecting the ink upon mass printing. In some cases, the build-up of the scorch may involve a problem that thermal energy cannot be effectively transferred from the heater to the ink, so that the quantity of the droplets ejected and the velocity of the droplets ejected are reduced compared with the initial printing, which adversely affects the quality of images formed. When it is intended to continuously achieve high-quality printing in this case, it is necessary to change the recording head. Such circumstances lead to increase in printing cost for users as a whole. Accordingly, achieving more reduction in kogation on the heater, which has a possibility of causing such circumstances, so as to more lengthen the life of the recording head is always an important technical problem to aim at a further improvement in the bubble-jet system.

For example, Japanese Patent Application Laid-Open No. 3-160070 has proposed an ink comprising an oxo anion. As examples of the oxo anion, are mentioned phosphates, polyphosphates, phosphoric esters, arsenates, molybdates, sulfates, sulfites and oxalates.

SUMMARY OF THE INVENTION

In view of the above technological background, an object of the present invention is to provide an ink for ink-jet recording capable of reducing kogation on the surface of a heater for applying thermal energy to an ink in a recording head to eject the ink from the recording head.

Another object of the present invention is to provide a method for alleviating scorch deposition on the surface of a heater for applying thermal energy to an ink in a recording head to eject the ink from the recording head.

Further object of the present invention is to provide an ink-jet recording apparatus which permits higher-quality printing and the achievement of a more lengthened life of a recording head.

A still further object of the present invention is to provide a recording unit which permits high-quality printing over a long period of time.

A still further object of the present invention is to provide a method for lengthening the life of a recording head to achieve further reduction in printing cost while providing high-quality prints.

The above objects can be achieved by the present invention described below.

According to a first aspect of the present invention, there is provided an ink for an ink-jet recording used with an ink-jet recording apparatus comprising an ink-jet recording head provided with a heater having an outermost protection layer comprising at least one of a metal and an oxide thereof, the ink-jet recording apparatus ejecting the ink by utilizing thermal energy, the ink comprising (a) colouring material; (b) liquid medium; and (c) at least one selected from the group consisting of polyolphosphates and salts thereof.

According to another aspect of the present invention, there is thus provided a method for alleviating scorch deposition on a surface of a heater of a recording head of an ink-jet recording apparatus, the heater being arranged to apply thermal energy to an ink in the recording head to eject the ink from an orifice of the recording head, and the heater having an outermost protection layer containing at least one selected from the group consisting of a metal and a metal oxide, wherein the ink comprises (a) a colouring material; (b) a liquid medium; and (c) at least one selected from the group consisting of polyolphosphates and salts thereof.

According to this constitution, the kogation on the outermost protective layer of the heater can be extremely effectively reduced. The reason why such an effect is brought about by using such an ink is not clearly known. However, it is considered that at least one selected from the group consisting of polyol phosphates and salts thereof in the ink interacts with the metal and/or the metal oxide making up the outermost protective layer of the heater to prevent kogation or facilitate decomposition of scorch and separation of scorch from the heater surface.

When the metal contained in the outermost protective layer of the heater is tantalum, or the metal oxide is tantalum oxide, the effect becomes more noticeable. Supposing that the quantity of energy applied to the heater is Eop, and the threshold quantity of energy applied to the heater, which is required to eject the ink, is Eth, the kogation-preventing effect of the present invention becomes far excellent when the quantity of energy applied to the heater is preset in such a manner that Eop meets the relationship $$1.10 \leq Eop/Eth < 1.60.$$

According to further aspect of the present invention, there is also provided an ink-jet recording method comprising the steps of applying pulse electric signals to a heater in an ink flow path according to recording signals, generating heat from the heater to heat ink in the ink flow path and ejecting ink from an orifice, wherein the ink comprises (a) colouring material; (b) liquid medium; and (c) at least one selected from the group consisting of polyolphosphates and salts thereof.

According to further aspect of the present invention, there is provided an ink-jet recording apparatus comprising: an ink container containing an ink; an ink-jet recording head having a heater for applying thermal energy to the ink within an ink flow path, the ink being fed from the ink container, and means for applying a pulsed electric signal in response to recording information, the heater being provided with an outermost protection layer containing at least one selected from a metal and a metal oxide, wherein the ink comprises (a) colouring material; (b) liquid medium; and (c) at least one selected from the group consisting of polyolphosphates and salts thereof.

According to still another aspect of the present invention, there is provided a recording unit comprising an ink container containing an ink, and an ink-jet recording head for ejecting the ink from an orifice by thermal energy, the ink-jet recording head having a heater for applying thermal energy to the ink, and the heater being provided with an outermost protection layer comprising at least one selected from the group consisting of a metal and a metal oxide, wherein the ink comprises (a) colouring material; (b) liquid medium; and (c) at least one selected from the group consisting of polyolphosphates and salts thereof.

According to still further aspect of the present invention, there is provided a method for prolonging a life of a recording head equipped with a heater, the recording head being used in an ink-jet recording method comprising a step of ejecting an ink through an orifice by applying thermal energy to the ink with the heater, the heater being provided with an outermost protection layer comprising at least one selected from the group consisting of a metal and a metal oxide, wherein the ink comprises (a) colouring material; (b) liquid medium; and (c) at least one selected from the group consisting of polyolphosphates and salts thereof.

DESCRIPTION OF THE PREFERRED EMBODIMENTS

Figure 1:
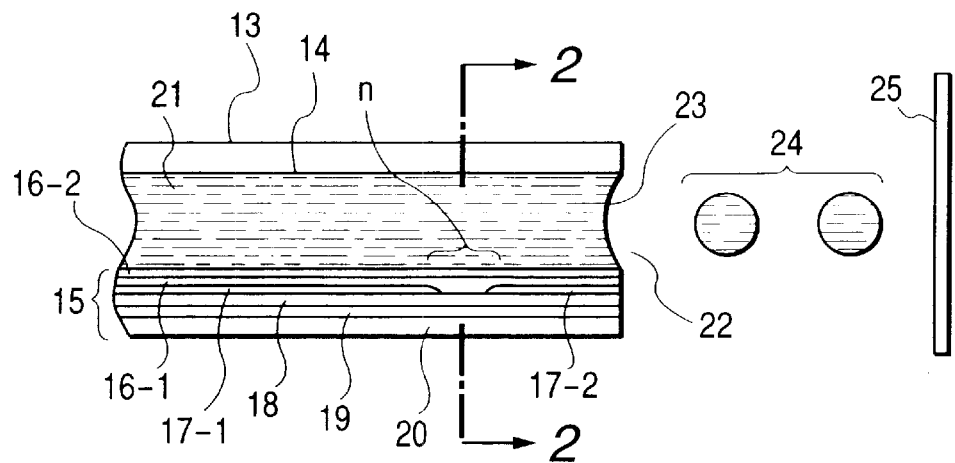
FIG. 1 is a longitudinal cross-sectional view of an exemplary head of an ink-jet recording apparatus.

The present invention will hereinafter be described in more detail by the preferred embodiments.

(Polyol Phosphates and Salts Thereof)

Polyol phosphates and salts thereof, which are main features of the present invention, will be first described. The present inventors have carried out an extensive investigation as to a method of reducing kogation on a heater of an ink-jet recording head in an ink-jet recording method in which an ink is ejected as ink droplets by the action of thermal energy. As a result, it has been found that when at least one selected from the group consisting of polyol phosphates, preferably α-glycerophosphoric acid and β-glycero-phosphoric acid, and salts thereof is contained in the ink, kogation can be very effectively reduced, thus leading to completion of the present invention.

Examples of the polyol phosphates include phosphoric esters of polyols, monosaccharides, ologosaccharides and polysaccharides. Specific examples thereof include α-glycerophosphoric acid, β-glycero-phosphoric acid, glucose-1-phosphoric acid, glucose-6-phosphoric acid, mannose-6-phosphoric acid, galactose-6-phosphoric acid, fructose-6-phosphoric acid, glucose-1,6-diphosphoric acid, fructose-1,6-diphosphoric acid, ascorbyl phosphoric acid, sucrose phosphoric acid, sorbitol phosphoric acid, phosphorylated polyglycerol and phosphorylated polyethylene glycol. In particular, alkali metal salts of α-glycerophosphoric acid and β-glycero-phosphoric acid are preferred materials high in kogation-inhibiting effect. Examples of salts of the polyol phosphates include metal salts (for example, alkali metal salts, alkaline earth metal salts, etc.) and amine salts (for example, ammonium salts, triethanolamine salts, etc.). The alkali metal salts are particularly preferred from the viewpoint of inhibition of kogation.

It goes without saying that these polyol phosphates may be used not only singly, but also in any combination thereof.

The total content of the polyol phosphates is 0.005 to 20% by weight based on the total weight of the ink. It is particularly preferred that the total content of the polyol phosphates containing at least one compound selected from the group consisting of α-glycerophosphoric acid, β-glycero-phosphoric acid and salts thereof be 0.05 to 15% by weight based on the total weight of the ink. If the total content is lower than 0.005% by weight, the kogation-reducing effect of such a component is not achieved. If the total content is higher than 20% by weight, it can no longer be expected that the effect is further enhanced. Therefore, such a high content is disadvantageous from the viewpoint of cost.

(Coloring Material)

The coloring material used in the present invention will be described. As the coloring material, a dye or pigment is preferably used.

(Dye)

As the dye, all dyes such as direct dyes, acid dyes, basic dyes and disperse dyes may be used.

Specific examples thereof include:

C.I. Direct Black 4, 9, 11, 17, 19, 22, 32, 80, 151, 154, 168, 171, 194 and 195;

C.I. Direct Blue 1, 2, 6, 8, 22, 34, 70, 71, 76, 78, 86, 142, 199, 200, 201, 202, 203, 207, 218, 236 and 287;

C.I. Direct Red 1, 2, 4, 8, 9, 11, 13, 15, 20, 28, 31, 33, 37, 39, 51, 59, 62, 63, 73, 75, 80, 81, 83, 87, 90, 94, 95, 99, 101, 110, 189, 225 and 227;

C.I. Direct Yellow 1, 2, 4, 8, 11, 12, 26, 27, 28, 33, 34, 41, 44, 48, 86, 87, 88, 132, 135, 142 and 144;

C.I. Food Black 1 and 2;

C.I. Acid Black 1, 2, 7, 16, 24, 26, 28, 31, 48, 52, 63, 107, 112, 118, 119, 121, 172, 194 and 208;

C.I. Acid Blue 1, 7, 9, 15, 22, 23, 27, 29, 40, 43, 55, 59, 62, 78, 80, 81, 90, 102, 104, 111, 185 and 254;

C.I. Acid Red 1, 4, 8, 13, 14, 15, 18, 21, 26, 35, 37, 52, 249, 257 and 289;

C.I. Acid Yellow 1, 3, 4, 7, 11, 12, 13, 14, 19, 23, 25, 34, 38, 41, 42, 44, 53, 55, 61, 71, 76 and 79;

C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44 and 46;

C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, 64 and 180;

C.I. Reactive Yellow 1, 2, 3, 4, 6, 7, 11, 12, 13, 14, 15, 16, 17, 18, 22, 23, 24, 25, 26, 27, 37 and 42;

C.I. Reactive Black 1, 3, 4, 5, 6, 8, 9, 10, 12, 13, 14 and 18; and

Projet Fast Cyan 2 (product of Zeneca Co.), Projet Fast Magenta 2 (product of Zeneca Co.), Projet Fast Yellow 2 (product of Zeneca Co.) and Projet Fast Black 2 (product of Zeneca Co.). However, the dyes used in the present invention are not limited to these dyes.

(Pigment)

As the pigment, all pigments such as inorganic pigments and organic pigments may be used.

Specific examples thereof include: Carbon black;

C.I. Pigment Yellow 1, 2, 3, 12, 13, 14, 16, 17, 73, 74, 75, 83, 93, 95, 97, 98, 114, 128, 129, 151, 154 and 195; C.I. Pigment Red 5, 7, 12, 48(Ca), 48(Mn), 57(Ca), 57:1, 57(Sr), 112, 122, 123, 168, 184 and 202;

C.I. Pigment Blue 1, 2, 3, 15:3, 15:34, 16, 22 and 60; and

C.I. Vat Blue 4 and 6.

When these pigments are used, it is preferable to use dispersing agents for stably dispersing such a pigments in an ink. The dispersing agents includes polymeric dispersing agents and surfactant type dispersing agents. Specific examples of the polymeric dispersing agents include polyacrylates, salts of styrene-acrylic acid copolymers, salts of styrene-methacrylic acid copolymers, salts of styrene-acrylic acid-acrylic ester terpolymers, salts of styrene-maleic acid copolymers, salts of acrylic ester-maleic acid copolymers, salts of styrene-methacrylsulfonic acid copolymers, salts of vinylnaphthalene-maleic acid copolymers, salts of β-naphthalenesulfonic acid-formalin condensates, polyvinylpyrrolidone, polyethylene glycol and polyvinyl alcohol. These polymers preferably have a weight average molecular weight ranging from 1,000 to 30,000 and an acid value ranging from 100 to 430. Examples of the surfactant type dispersing agents include lauryl benzenesulfonate, lauryl sulfonate, lauryl benzenecarboxylate, lauryl naphthalenesulfonate, aliphatic amine salts and polyethylene oxide condensates. The amount of these dispersing agents used is preferably within a range of from 10:5 to 10:0.5 in terms of a ratio of the weight of the pigment to the weight of the dispersing agent.

(Self-dispersing Carbon Black)

Carbon black capable of self-dispersing, which is obtained by introducing a water-soluble group into the surface of carbon black as described in Japanese Patent Application Laid-Open Nos. 5-186704 and 8-3498, may also be used. No dispersing agent may be used when the self-dispersing carbon black is used.

These dyes and pigments may be used either singly or in any combination thereof. The concentration of these dyes and pigments is generally selected suitably from a range of from 0.1 to 20% by weight based on the total weight of the ink.

(Liquid Medium)

The liquid medium used in the present invention will now be described. As the liquid medium, it is preferable to use water and a water-soluble organic solvent in combination.

With respect to the water used in the present invention, it is desirable to use deionized water instead of tap water containing various ions. The content of water is preferably within a range of from 35 to 96% by weight based on the total weight of the ink.

The water-soluble organic solvent is used for adjusting the viscosity of an ink to a suitable viscosity preferred from the viewpoint of practical use, and for slowing the drying speed of the ink or enhancing the solubility of the coloring material to prevent clogging at an orifice in a recording head. Specific examples of the water-soluble organic solvent include alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones and ketone alcohols such as acetone and diacetone alcohol; ethers such as tetrahydrofuran and dioxane; oxyethylene or oxypropylene copolymers such as diethylene glycol, triethylene glycol, tetraethylene glycol, dipropylene glycol, tripropylene glycol, polyethylene glycol and polypropylene glycol; alkylene glycols the alkylene moiety of which has 2 to 6 carbon atoms, such as ethylene glycol, propylene glycol, trimethylene glycol and triethylene glycol; 1,2,6-hexanetriol; glycerol; trimethylolethane and trimethylolpropane; lower alkyl ethers, such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols, such as triethylene glycol dimethyl (or diethyl) ether and tetraethylene glycol dimethyl (or diethyl) ether; alkanolamines such as monoethanolamine, diethanolamine and triethanolamine; sulfolane; N-methyl-2-pyrrolidone; 2-pyrrolidone; and 1,3-dimethyl-2-imidazolidinone. Such water-soluble organic solvents as mentioned above may be used either singly or in any combination thereof.

(Additives)

In order to keep the pH value of the ink according to the present invention constant to stabilize the solubility of the dye or the dispersibility of the pigment in the ink, a pH adjuster may be contained in the ink. Specific examples of the pH adjuster include hydroxides such as lithium hydroxide, sodium hydroxide, potassium hydroxide and ammonium hydroxide; sulfates such as lithium sulfate, sodium sulfate, potassium sulfate and ammonium sulfate; carbonates such as lithium carbonate, sodium carbonate, sodium hydrogencarbonate, potassium carbonate, potassium hydrogencarbonate, sodium potassium carbonate, ammonium carbonate and ammonium hydrogencarbonate; phosphates such as lithium phosphate, monosodium phosphate, disodium phosphate, trisodium phosphate, monopotassium phosphate, dipotassium phosphate, tripotassium phosphate, monoammonium phosphate, diammonium phosphate and triammonium phosphate; and acetates such as lithium acetate, sodium acetate, potassium acetate and ammonium acetate.

These salts may be added singly to the ink. However, it is preferable to use at least two of these salts in combination. The total amount of these salts added is preferably 0.1 to 10% by weight, more preferably 1 to 8% by weight. If the amount added is less than 0.1% by weight, it is difficult to keep the pH of the ink constant, so that little effect is exerted on the solution stability of the hydrophilic dye contained in the ink. On the other hand, if the amount is greater than 10% by weight, crystals of these salts are deposited to cause clogging of nozzles, and the like. It is not rather preferable to add the pH adjuster in such a great amount.

To the inks according to the present invention, the conventionally known various general additives, for example, viscosity modifiers, mildewproofing agents, antiseptics, antioxidants, antifoaming agents, surfactants and agents for preventing the drying of nozzles, such as urea, may be added in suitable combination in addition to the above-described components, as needed.

(Physical Properties of the Ink)

With respect to the physical properties of the inks according to the present invention, the pH is preferably within a range of from 3 to 12, more preferably 4 to 10, the surface tension is preferably within a range of from 10 to 60 dyn/cm, more preferably 15 to 50 dyn/cm, and the viscosity is preferably within in a range of from 1 to 30 cP, more preferably from 1 to 10 cP, all, as measured at about 25° C.

(Recording Method)

A recording method suitable for use in recording with the inks according to the present invention is an ink-jet recording method in which thermal energy corresponding to recording signals is applied to an ink within a recording head, and ink droplets are generated by the thermal energy. Such recording apparatus as the inks according to the present invention are suitably used will hereinafter be described with reference to the drawings.

Figure 2:
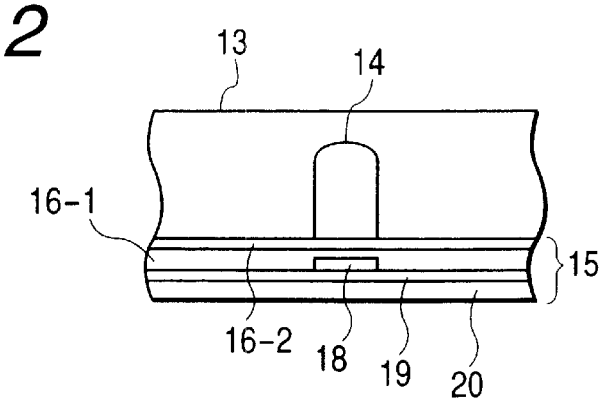
FIG. 2 is a transverse cross-sectional view of the head of the ink-jet recording apparatus.

An example of the construction of a head, which is a main component of an ink-jet recording apparatus making good use of thermal energy is first illustrated in FIGS. 1 and 2. FIG. 1 is a cross-sectional view of a head 13 taken along the flow path of ink, and FIG. 2 is a cross-sectional view taken along line 2—2 in FIG. 1. The head 13 is formed by bonding a glass, ceramic, silicon, polysulfone or plastic plate or the like having a flow path (nozzle) 14 through which an ink is passed, to a heating substrate 15. The heating substrate 15 is composed of a protective layer 16-1 made of silicon oxide, silicon nitride, silicon carbide or the like, an outermost protective layer 16-2 formed of a metal or metal oxide, preferably, tantalum or tantalum oxide, or the like, electrodes 17-1 and 17-2 formed of aluminum, gold, aluminum-copper alloy or the like, a heating resistor layer 18 formed of a high-melting material such as, hafnium boride, tantalum nitride or tantalum aluminum, a heat accumulating layer 19 formed of silicon oxide, aluminum oxide or the like, and a substrate 20 made of silicon, aluminum, aluminum nitride or the like having a good heat radiating property.

Figure 3:
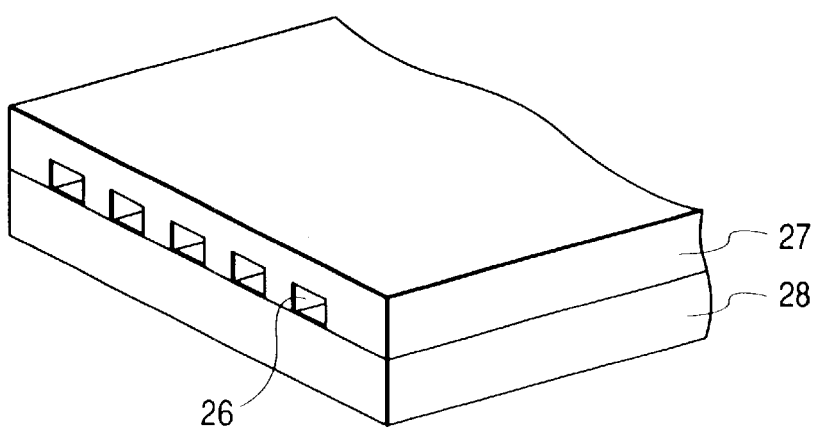
FIG. 3 is a perspective view of the appearance of a multi-head which is an array of such heads as shown in FIG. 1.

Now, upon application of pulsed electric signals to the electrodes 17-1 and 17-2 of the head 13, the heating substrate 15 rapidly generates heat at the region (heater) shown by "n" to form bubbles in an ink 21 which is in contact with this region. A meniscus 23 of the ink is projected by the pressure thus produced, and the ink 21 is ejected in the form of ink droplets 24 from an ejection orifice 22 through the nozzle 14 of the head 13 toward a recording medium 25. FIG. 3 illustrates an appearance of a multi-head composed of an array of a number of heads as shown in FIG. 1. The multi-head is formed by closely bonding a glass plate 27 having a number of nozzles 26 to a heating head 28 similar to that described in FIG. 1.

(Quantity of Energy Applied to Heater)

Energy applied to the heater will now be described. Supposing that the threshold quantity of energy applied to the heater that is required to eject ink is Eth, and energy actually applied is Eop, a ratio (Eop/Eth) between them will be expressed as r. More specifically, supposing that a width of a pulse applied to the bubble-jet head is P (when a plurality of pulses are applied in portions, it means the total width thereof), voltage applied is V, and resistance of the heater is R, energy E applied can be expressed as $$E = P \times V^2 / R \qquad (1).$$

At this time, when the threshold quantity of energy applied to the heater that is required to eject ink is Eth, and energy actually applied upon driving is Eop, the r value is given by $$r = Eop/Eth \qquad (2).$$

Examples of a method for finding the r value from the driving conditions of the bubble-jet head include the following two methods.

Method 1: Case Where a Pulse Width is Fixed

Proper voltage with which the bubble-jet head can conduct ejection in a given pulse width is first found to drive the head. The voltage is then gradually lowered to find voltage with which the ejection is stopped. The lowest voltage with which ejection can be conducted right before the ejection is stopped is regarded as Vth. When voltage actually used upon driving is regarded as Vop, the r value can be found by $$r = (Vop/Vth)^2.$$

Method 2: Case Where Voltage is Fixed

A proper pulse width with which the bubble-jet head can conduct ejection in given voltage is first found to drive the head. The pulse width is then gradually shortened to find a pulse width with which the ejection is stopped. The shortest pulse width with which ejection can be conducted right before the ejection is stopped is regarded as Pth. When a pulse width actually used upon driving is regarded as Pop, the r value can be found by $$r = Pop/Pth.$$

Incidentally, the voltage value as referred to herein is voltage actually applied to a heater portion for heating the BJ heater. The voltage applied from the outside of the head may be lowered by contacts, resistance of wiring, and the like. When the Vth and Vop are measured from the outside of the head, however, measurement is conducted with these voltage variations included in both values. Therefore, an error is small even when these measured values are directly used to calculate the r value so far as the voltage variations are not very large, and the use of the calculated value as the r value has no trouble.

Attention must be paid to the fact that when recording is conducted by an actual printer, voltage to one heater may possibly be affected by this to vary it because plural heaters are driven.

From the above equations (1) and (2), the square of V seems to be inversely proportional to P in the same r value. In fact, the square of V is not simply related to p because of a electrical problem that a pulse shape does not become a rectangle, a thermal problem that heat diffusion about the heater is different when pulse shape varies, and a problem characteristic of bubble jet that heat flux from the heater to the ink is different to change a bubbling state when voltage varies. Accordingly, the above methods 1 and 2 must be treated independently of each other, and one must take care that an error is produced when one value is converted into the other value by calculation. In this specification, the values found in accordance with Method 1 will be adopted as r values unless expressly noted.

In order to stably eject an ink, it is general to drive a recording head under the r value of about 1.12 to 1.96. However, when thermal energy is applied to an ink comprising at least one selected from the group consisting of polyol phosphates and salts thereof to eject it from a recording head, it is preferred that the recording head be driven under an r value within the prescribed range, specifically, from 1.10 to 1.60 in that kogation on a heater can be prevented, and in its turn the life of the recording head can be more lengthened. The reason why the kogation can be particularly effectively prevented within this range, and the life of the recording head can be lengthened is not clearly known. It is however considered that it is prevented to excessively raise the surface temperature of the heater by supplying the heater with energy in excess, and no excessive corrosion of the metal by polyol phosphates and salts thereof occurs.

Figure 4:
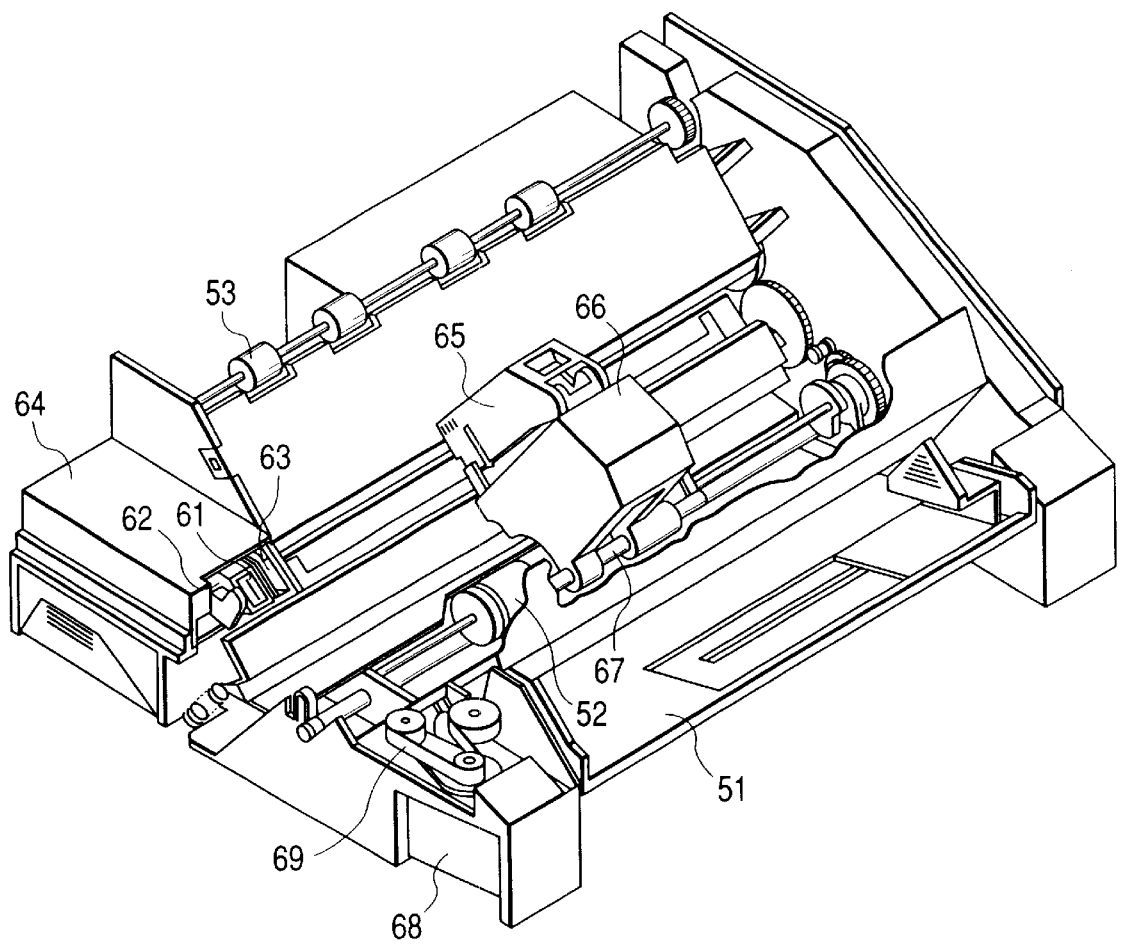
FIG. 4 is a schematic perspective view illustrating an exemplary ink-jet recording apparatus.

FIG. 4 illustrates an example of an ink-jet recording apparatus in which such a head as described above has been incorporated. In FIG. 4, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved.

Reference numeral 62 indicates a cap for the face of ejection openings of the recording head 65, which is provided at a home position adjacent to the blade 61, and is so constructed that it moves in a direction perpendicular to a direction in which the recording head 65 is moved, and comes into contact with the face of the ejection openings to cap it. Reference numeral 63 denotes an ink absorbing member provided adjoiningly to the blade 61 and, similar to the blade 61, held in such a form that it protrudes into the course through which the recording head 65 is moved. The above-described blade 61, cap 62 and ink absorbing member 63 constitute an ejection-recovery portion 64, where the blade 61 and ink absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a feeding part from which the recording medium is inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording. In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped.

When the cap 62 comes into contact with the ejection opening face of the recording head 65 to cap it, the cap 62 is moved so as to protrude into the path of motion of the recording head 65. When the recording head 65 is moved from its home position to the position at which recording is started, the cap 62 and the blade 61 are at the same positions as the positions for the wiping as described above. As a result, the ejection opening face of the recording head 65 is also wiped at the time of this movement. The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
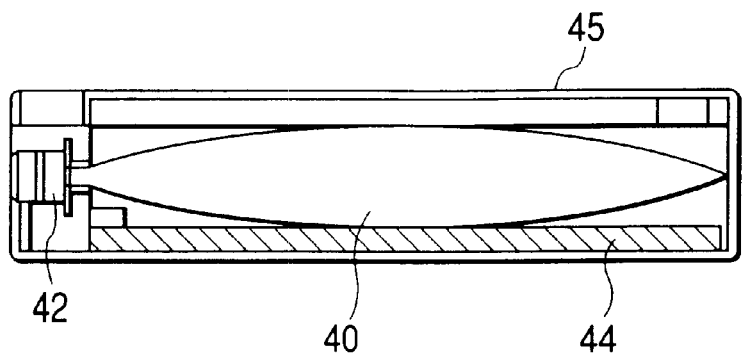
FIG. 5 is a longitudinal cross-sectional view illustrating an exemplary ink cartridge.

FIG. 5 illustrates an exemplary ink cartridge 45 in which an ink to be fed to a recording head through an ink-feeding member, for example, a tube is contained. Here, a member 40 making up a part of the ink cartridge 45 is an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an absorbing member for receiving a waste ink. It is preferred that the ink container portion 40 be formed of a polyolefin, in particular, polyethylene, at its surface with which the ink comes into contact.

Figure 6:
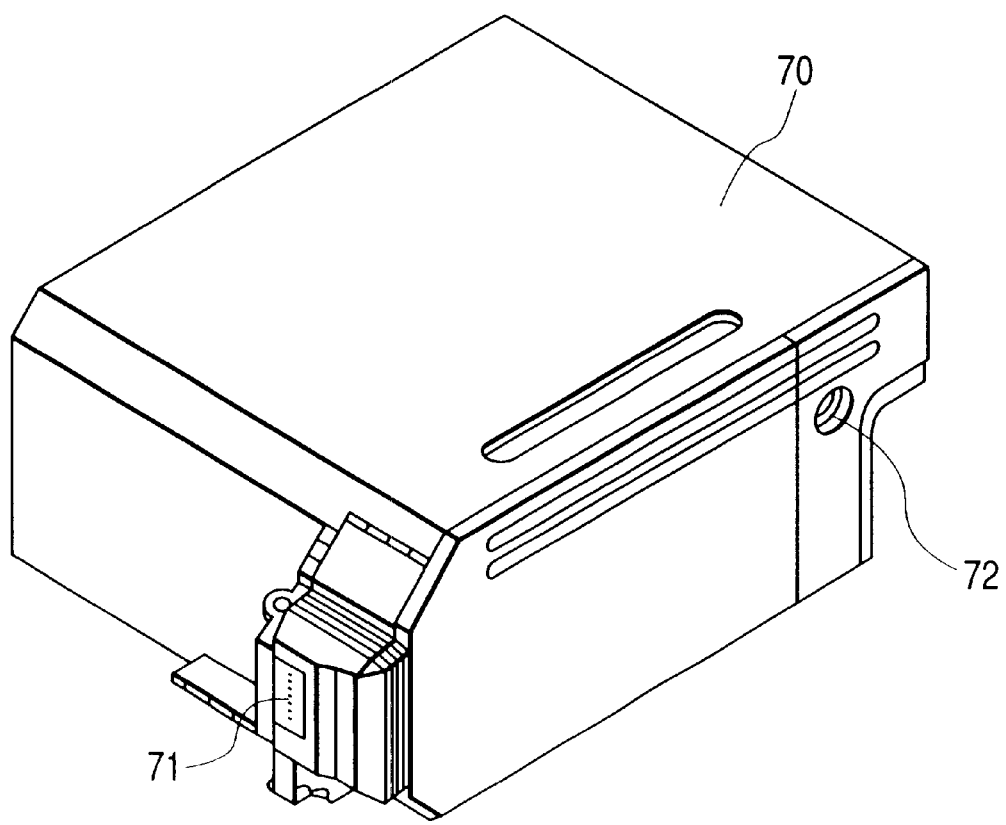
FIG. 6 is a perspective view illustrating an exemplary recording unit.

The ink-jet recording apparatus used in the present invention is not limited to the apparatus as described above in which the head and the ink cartridge are separately provided. Therefore, a device in which these members are integrally formed as shown in FIG. 6 can also be preferably used. In FIG. 6, reference numeral 70 designates a recording unit, in the interior of which an ink container portion containing an ink, for example, an ink absorbing member, is contained. The recording unit 70 is so constructed that the ink in such an ink absorbing member is ejected in the form of ink droplets through a head 71 having a plurality of orifices. In the present invention, polyurethane is preferably used as a material for the ink absorbing member. The ink container portion may be constructed without using the ink absorbing member by a bag for the ink in the interior of which a spring or the like is provided. Reference numeral 72 indicates an air passage for communicating the interior of the recording unit 70 with the atmosphere. This recording unit 70 is used in place of the recording head 65 shown in FIG. 4, and is detachably installed on the carriage 66.

As described above, according to the present invention, there are provided inks which can lengthen the life of a recording head by reducing kogation on a heater of the recording head when they are used in ink-jet recording making good use of thermal energy, a method for lengthening the life of the recording head by reducing kogation on the heater of the recording head, and ink-jet recording process and ink-jet recording apparatus using such inks.

The present invention will hereinafter be described more specifically by the following Examples and Comparative Examples. However, the present invention is not limited to the following examples so far as it does not exceed the subject matter thereof. Incidentally, all designations of "part" or "parts" and "%" as will be used in the following examples mean part or parts by weight and % by weight unless expressly noted.

EXAMPLES 1 TO 4

Comparative Example 1

The following respective components were mixed and thoroughly stirred into solutions: The resultant solutions were then filtered under pressure through a microfilter (product of Fuji Photo Film Co., Ltd.) having a pore size of 0.2 µm, thereby preparing an ink according to Example A, and an ink according to Comparative Example A, in which disodium β-glycero-phosphate pentahydrate was removed from the ink of Example A.

Ink Composition of Example A

| | |
|---|---|
| Projet Fast Black 2 (product of Zeneca Co. | 2 parts |
| Diethylene glycol | 10 parts |

-continued

| | |
|---|---|
| Disodium β-glycerophosphate pentahydrate | 2.8 parts |
| Sodium hydroxide | 0.1 parts |
| Water | 85.1 parts. |

Ink Composition of Comparative Example A

| | |
|---|---|
| Projet Fast Black 2 (product of Zeneca Co.) | 2 parts |
| Diethylene glycol | 10 parts |
| Sodium hydroxide | 0.1 parts |
| Water | 87.9 parts. |

[Evaluation 1]

The ink of Example A was used to conduct the following evaluation by means of an ink-jet recording apparatus having an On-Demand type multi-recording head (BC-02, trade name, manufactured by Canon Inc.; the outermost protective layer on a heater is formed of tantalum and tantalum oxide) which ejects an ink by applying thermal energy in response to recording signals to the ink. In the evaluation, Vth (critical voltage that the recording head may barely conduct ejection) was actually measured at a pulse width of 1.1 $\mu$s (On)+3.0 $\mu$s (Off)+3.2 $\mu$s (On) and a driving frequency of 6250 Hz, and the evaluation was conducted at Vop (driving voltage) corresponding to an r value of 1.39 to regard it as EXAMPLE 1. Incidentally, Vop (driving voltage) was calculated out in accordance with the equation $$Vop = \sqrt{r} \times Vth.$$

Using the ink of Example A, the same evaluation was conducted at Vop (driving voltage) corresponding to an r value of 1.10 to regard it as EXAMPLE 2, the same evaluation was conducted at Vop (driving voltage) corresponding to an r value of 1.48 to regard it as EXAMPLE 3, and the same evaluation was conducted at Vop (driving voltage) corresponding to an r value of 1.56 to regard it as EXAMPLE 4. Besides, the same evaluation was conducted at Vop (driving voltage) corresponding to an r value of 1.61 to regard it as REFERENTIAL EXAMPLE 1, and the same evaluation was conducted at Vop (driving voltage) corresponding to an r value of 1.69 to regard it as REFERENTIAL EXAMPLE 2. On the other hand, using the ink of Comparative Example A, the same evaluation was conducted at Vop (driving voltage) corresponding to an r value of 1.39 to regard it as COMPARATIVE EXAMPLE 1. The results are shown in Table 1.

Ejection Durability

Continuous ejection was conducted by the above-described apparatus under the above-described respective driving conditions to collect a droplet ejected from the recording head every $1 \times 10^6$ droplets in a container and weigh it by an electronic balance. An average quantity in $1 \times 10^6$ droplets ejected was calculated from an increment in the weight of the container. The continuous ejection was conducted up to $1 \times 10^8$ droplets to conduct the evaluation in accordance with the following standard.

A: An average quantity of droplets ejected between the $9.9 \times 10^7$-th droplet and the $1 \times 10^8$-th droplet was at least 90% of an average quantity of droplets ejected between 0 and $1 \times 10^6$-th droplet;

B: An average quantity of droplets ejected between the $9.9 \times 10^7$-th droplet and the $1 \times 10^8$-th droplet was not lower than 70%, but lower than 90% of an average quantity of droplets ejected between 0 and $1 \times 10^6$-th droplet;

C: An average quantity of droplets ejected between the $9.9 \times 10^7$-th droplet and the $1 \times 10^8$-th droplet was lower than 70% of an average quantity of droplets ejected between 0 and $1 \times 10^6$-th droplet;

D: Led into a failure to eject in the course.

Degree of Kogation

The recording head of the recording apparatus used in the ejection durability test was disassembled after completion of the evaluation to observe the surface of the heater in the nozzle used in the ejection durability test through an optical microscope (400 magnifications), thereby evaluating the degree of kogation in accordance with the following standard:

A: Kogation was scarcely observed;

B: Kogation was slightly observed, but no practical problem was caused;

C: Kogation was observed to a great extent;

D: Kogation was observed to a very great extent.

Ink Composition of Example 5

| | |
|---|---|
| Projet Fast Black 2 (product of Zeneca Co. | 2 parts |
| Diethylene glycol | 10 parts |
| Dipotassium glucose-1-phosphate dihydrate | 2 parts |
| Sodium hydroxide | 0.1 parts |
| Water | 85.9 parts. |

Ink Composition of Example 6

| | |
|---|---|
| Projet Fast Black 2 (product of Zeneca Co.) | 2 parts |
| Diethylene glycol | 10 parts |
| Disodium α-glycerophosphate hexahydrate | 2.8 parts |
| Sodium hydroxide | 0.1 parts |
| Water | 85.1 parts. |

Ink Composition of Example 7

| | |
|---|---|
| Projet Fast Yellow 2 (product of Zeneca Co. | 3 parts |
| Diethylene glycol | 10 parts |
| Disodium β-glycerophosphate pentahydrate | 1 part |
| Water | 86 parts. |

Ink Composition of Example 8

| | |
|---|---|
| Projet Fast Magenta 2 (product of Zeneca Co. | 3 parts |
| Diethylene glycol | 10 parts |
| Disodium β-glycerophosphate pentahydrate | 1 part |
| Water | 86 parts. |

Ink Composition of Example 9

| Projet Fast Cyan 2 (product of Zeneca Co. | 4 parts |
|---|---|
| Diethylene glycol | 10 parts |
| Disodium β-glycerophosphate pentahydrate | 1 part |
| Water | 85 parts. |

Ink Composition of Example 10

| Projet Fast Black 2 (product of Zeneca Co. | 2 parts |
|---|---|
| Glycerol | 5 parts |
| Diethylene glycol | 5 parts |
| Urea | 4 parts |
| 2-Propanol | 3.5 parts |
| Disodium β-glycerophosphate pentahydrate | 10 parts |
| Sodium hydroxide | 0.1 parts |
| Ammonium sulfate | 0.1 parts |
| Water | 70.3 parts. |

EXAMPLE 11
(Preparation of Pigment Dispersion 1)

| Styrene-acrylic acid-butyl acrylate terpolymer (acid value: 116;, average molecular weight: 3,700) | 5 parts |
|---|---|
| Triethanolamine | 0.5 parts |
| Diethylene glycol | 5 parts |
| Water | 69.5 parts. |

The above components were mixed, and the mixture was heated to 70° C. in a water bath, thereby completely dissolving the resin component. To this solution, were added 15 parts of carbon black, "MA-100" (trade name; pH: 3.5; product of Mitsubishi Kagaku Co., Ltd.) and 5 parts of 2-propanol to premix the components for 30 minutes. Thereafter, the resultant premix was subjected to a dispersion treatment under the following conditions.

Dispersing machine: sand grinder (manufactured by Igarashi Kikai K.K.)

Grinding medium: zirconium beads (diameter: 1 mm)

Packing rate of grinding medium: 50% (by volume)

Grinding time: 3 hours.

The thus-treated mixture was further subjected to a centrifugal treatment (12,000 rpm, 20 minutes) to remove coarse particles, thereby obtaining Pigment Dispersion 1.
(Preparation of Ink of Example 11)

The following components were mixed in a beaker and stirred at 25° C. for 3 hours to prepare an ink of EXAMPLE 11 used in the present invention.

| Pigment Dispersion 1 | 30 parts |
|---|---|
| Diethylene glycol | 10 parts |
| 2-Propanol | 2 parts |
| Disodium β-glycerophosphate pentahydrate | 1 part |
| Water | 57 parts. |

EXAMPLE 12
(Preparation of Pigment Dispersion 2)

After 300 g of commercially-available acid carbon black, "MA77" (trade name; pH: 3.0; product of Mitsubishi Kagaku Co., Ltd.) were thoroughly mixed with 1,000 ml of water, 450 g of sodium hypochlorite (available chlorine concentration: 12%) were added dropwise to the mixture, followed by stirring for 10 hours at 100 to 105° C. The resultant slurry was filtered through Toyo Filter Paper No. 2 (product of Advantes Co.) to fully wash the resultant pigment particles with water. The wet cake of this pigment was dispersed again in 3,000 ml of water, and the dispersion was desalted by means of a reverse osmosis membrane to a conductivity of 0.2 μs. The pigment dispersion (pH: 8 to 10) was concentrated to a pigment concentration of 10% by weight. The above-described process was followed to introduce a —COONa group into the surface of carbon black.
(Preparation of Ink of Example 12)

The following components were mixed in a beaker and stirred at 25° C. for 3 hours. The mixture was filtered under pressure through a membrane filter (product of Sumitomo Electric Industries, Ltd.) having a pore size of 3.0 μm to prepare an ink of EXAMPLE 12 used in the present invention.

| Pigment Dispersion 2 | 30 parts |
|---|---|
| Glycerol | 5 parts |
| Trimethylolpropane | 5 parts |
| Ethylene oxide adduct of acetylene glycol (Acetylenol EH, trade name, product of Kawaken Fine Chemicals Co., Ltd.) | 0.2 parts |
| Disodium β-glycerophosphate pentahydrate | 1 part |
| Water | 58.8 parts. |

EXAMPLE 13

| (Preparation of Pigment Dispersion 3) | |
|---|---|
| Styrene-acrylic acid copolymer (acid value: 200;, average molecular weight: 7,000 | 5.5 parts |
| Monoethanol amine | 1.0 parts |
| Ion-exchanged water | 67.5 parts |
| Diethylene glycol | 5.0 parts. |

The above components were mixed, and the mixture was heated to 70° C. in a water bath, thereby completely dissolving the resin component.

To this solution, were added 20 parts of C.I. Pigment Yellow 93 and 1.0 part of isopropyl alcohol to premix the components for 30 minutes. Thereafter, the resultant premix was subjected to a dispersion treatment under the following conditions.

Dispersing machine: sand grinder

Grinding medium: glass beads (diameter: 1 mm)

Packing rate of grinding medium: 50% (by volume)

Grinding time: 3 hours.

The thus-treated mixture was further subjected to a centrifugal treatment (12,000 rpm, 20 minutes) to remove coarse particles, thereby obtaining Pigment Dispersion 3.
(Preparation of Ink of Example 13)

The following components were mixed in a beaker and stirred at 25° C. for 3 hours to prepare an ink of EXAMPLE 13 used in the present invention.

| | |
|---|---|
| Pigment Dispersion 3 | 20 parts |
| Glycerol | 15 parts |
| Diethylene glycol | 10 parts |
| Acetylenol EH (trade name, product of Kawaken Fine Chemicals Co., Ltd.) | 0.3 parts |
| Disodium β-glycerophosphate pentahydrate | 1 part |
| Water | 53.7 parts. |

EXAMPLE 14

| (Preparation of Pigment Dispersion 4) | |
|---|---|
| Styrene-acrylic acid copolymer (acid value: 200;, average molecular weight: 7,000) | 5.5 parts |
| Monoethanolamine | 1.0 parts |
| Ion-exchanged water | 67.5 parts |
| Diethylene glycol | 5.0 parts. |

The above components were mixed, and the mixture was heated to 70° C. in a water bath, thereby completely dissolving the resin component.

To this solution, were added 20 parts of C.I. Pigment Red 122 and 1.0 part of isopropyl alcohol to premix the components for 30 minutes. Thereafter, the resultant premix was subjected to a dispersion treatment under the following conditions.

Dispersing machine: sand grinder

Grinding medium: glass beads (diameter: 1 mm)

Packing rate of grinding medium: 50% (by volume)

Grinding time: 3 hours.

The thus-treated mixture was further subjected to a centrifugal treatment (12,000 rpm, 20 minutes) to remove coarse particles, thereby obtaining Pigment Dispersion 4.

(Preparation of Ink of Example 14)

The following components were mixed in a beaker and stirred at 25° C. for 3 hours to prepare an ink of EXAMPLE 14 used in the present invention.

| | |
|---|---|
| Pigment Dispersion 4 | 20 parts |
| Glycerol | 15 parts |
| Diethylene glycol | 10 parts |
| Acetylenol EH (trade name, product of Kawaken Fine Chemicals Co., Ltd.) | 0.3 parts |
| Disodium β-glycerophosphate pentahydrate | 1 part |
| Water | 53.7 parts. |

EXAMPLE 15

| (Preparation of Pigment Dispersion 5) | |
|---|---|
| Styrene-acrylic acid copolymer (acid value: 200;, average molecular weight: 7,000) | 5.5 parts |
| Monoethanolamine | 1.0 parts |
| Ion-exchanged water | 67.5 parts |
| Diethylene glycol | 5.0 parts. |

The above components were mixed, and the mixture was heated to 70° C. in a water bath, thereby completely dissolving the resin component.

To this solution, were added 20 parts of C.I. Pigment Blue 15:3 and 1.0 part of isopropyl alcohol to premix the components for 30 minutes. Thereafter, the resultant premix was subjected to a dispersion treatment under the following conditions.

Dispersing machine: sand grinder

Grinding medium: glass beads (diameter: 1 mm)

Packing rate of grinding medium: 50% (by volume)

Grinding time: 3 hours.

The thus-treated mixture was further subjected to a centrifugal treatment (12,000 rpm, 20 minutes) to remove coarse particles, thereby obtaining Pigment Dispersion 5.

(Preparation of Ink of Example 15)

The following components were mixed in a beaker and stirred at 25° C. for 3 hours to prepare an ink of EXAMPLE 15 used in the present invention.

| | |
|---|---|
| Pigment Dispersion 5 | 20 parts |
| Glycerol | 15 parts |
| Diethylene glycol | 10 parts |
| Acetylenol EH (trade name, product of Kawaken Fine Chemicals Co., Ltd.) | 0.3 parts |
| Disodium β-glycerophosphate pentahydrate | 1 part |
| Water | 53.7 parts. |

Comparative Examples 2 to 11

The following respective components were mixed and thoroughly stirred into solutions. The resultant solutions were then filtered under pressure through a microfilter (product of Fuji Photo Film Co., Ltd.) having a pore size of 0.2 μm, thereby preparing inks according to COMPARATIVE EXAMPLES 2 to 11.

Ink Composition of Comparative Example 2

| | |
|---|---|
| Projet Fast Black 2 (product of Zeneca Co. | 2 parts |
| Diethylene glycol | 10 parts |
| Sodium hydroxide | 0.1 parts |
| Water | 87.9 parts. |

Ink Composition of Comparative Example 3

| | |
|---|---|
| Projet Fast Yellow 2 (product of Zeneca Co. | 3 parts |
| Diethylene glycol | 10 parts |
| Water | 87 parts. |

Ink Composition of Comparative Example 4

| Projet Fast Magenta 2 (product of Zeneca Co.) | 3 parts |
|---|---|
| Diethylene glycol | 10 parts |
| Water | 87 parts. |

Ink Composition of Comparative Example 5

| Projet Fast Cyan 2 (product of Zeneca Co.) | 4 parts |
|---|---|
| Diethylene glycol | 10 parts |
| Water | 86 parts. |

Ink Composition of Comparative Example 6

| Projet Fast Black 2 (product of Zeneca Co. | 2 parts |
|---|---|
| Glycerol | 5 parts |
| Diethylene glycol | 5 parts |
| Urea | 5 parts |
| Sodium hydroxide | 0.1 parts |
| Ammonium sulfate | 0.1 parts |
| Water | 82.8 parts. |

Ink Composition of Comparative Example 7

The following components were mixed in a beaker and stirred at 25° C. for 3 hours to prepare an ink of COMPARATIVE EXAMPLE 7.

| Pigment Dispersion 1 | 30 parts |
|---|---|
| Diethylene glycol | 10 parts |
| 2-Propanol | 2 parts |
| Water | 58 parts. |

Ink Composition of Comparative Example 8

The following components were mixed in a beaker and stirred at 25° C. for 3 hours. The mixture was filtered under pressure through a membrane filter (product of Sumitomo Electric Industries, Ltd.) having a pore size of 3.0 $\mu$m to prepare an ink of COMPARATIVE EXAMPLE 8.

| Pigment Dispersion 2 | 30 parts |
|---|---|
| Glycerol | 5 parts |
| Trimethylolpropane | 5 parts |
| Ethylene oxide adduct of acetylene glycol (Acetylenol EH, trade name, product of Kawaken Fine Chemicals Co., Ltd.) | 0.2 parts |
| Water | 59.8 parts. |

Ink Composition of Comparative Example 9

The following components were mixed in a beaker and stirred at 25° C. for 3 hours to prepare an ink of COMPARATIVE EXAMPLE 9.

| Pigment Dispersion 3 | 20 parts |
|---|---|
| Glycerol | 15 parts |
| Diethylene glycol | 10 parts |
| Acetylenol EH (trade name, product of Kawaken Fine Chemicals Co., Ltd.) | 0.3 parts |
| Water | 54.7 parts. |

Ink Composition of Comparative Example 10

The following components were mixed in a beaker and stirred at 25° C. for 3 hours to prepare an ink of COMPARATIVE EXAMPLE 10.

| Pigment Dispersion 4 | 20 parts |
|---|---|
| Glycerol | 15 parts |
| Diethylene glycol | 10 parts |
| Acetylenol EH (trade name, product of Kawaken Fine Chemicals Co., Ltd.) | 0.3 parts |
| Water | 54.7 parts. |

Ink composition of Comparative Example 11

The following components were mixed in a beaker and stirred at 25° C. for 3 hours to prepare an ink of COMPARATIVE EXAMPLE 11.

| Pigment Dispersion 5 | 20 parts |
|---|---|
| Glycerol | 15 parts |
| Diethylene glycol | 10 parts |
| Acetylenol EH (trade name, product of Kawaken Fine Chemicals Co., Ltd.) | 0.3 parts |
| Water | 54.7 parts. |

[Evaluation 2]

The inks of EXAMPLES 5 to 15 and COMPARATIVE EXAMPLES 2 to 11 were used to conduct the following evaluation by means of an ink-jet recording apparatus having an On-Demand type multi-recording head (BC-02, trade name, manufactured by Canon Inc.; the outermost protective layer on a heater is formed of tantalum and tantalum oxide) which ejects an ink by applying thermal energy in response to recording signals to the ink. In the evaluation, Vth (critical voltage that the recording head may barely conduct ejection) was actually measured at a pulse width of 1.1 $\mu$s (On)+3.0 $\mu$s (Off)+3.2 $\mu$s (On) and a driving frequency of 6250 Hz, and the evaluation was conducted at Vop (driving voltage) corresponding to an r value of 1.39. The results are shown in Table 2.

Ejection Durability

Continuous ejection was conducted by the above-described apparatus under the above-described respective driving conditions to collect a droplet ejected from the recording head every $1 \times 10^6$ droplets in a container and weigh it by an electronic balance. An average quantity in $1 \times 10^6$ droplets ejected was calculated from an increment in the weight of the container. The continuous ejection was conducted up to $1 \times 10^8$ droplets to conduct the evaluation in accordance with the following standard.

A: An average quantity of droplets ejected between the $9.9 \times 10^7$-th droplet and the $1 \times 10^8$-th droplet was at least 90% of an average quantity of droplets ejected between 0 and $1 \times 10^6$-th droplet;

B: An average quantity of droplets ejected between the $9.9 \times 10^7$-th droplet and the $1 \times 10^8$-th droplet was not lower than 70%, but lower than 90% of an average quantity of droplets ejected between 0 and $1 \times 10^6$-th droplet;

C: An average quantity of droplets ejected between the 9.9×10$^7$-th droplet and the 1×10$^8$-th droplet was lower than 70% of an average quantity of droplets ejected between 0 and 1×10$^6$-th droplet;

D: Led into a failure to eject in the course.

Degree of Kogation

The recording head of the recording apparatus used in the ejection durability test was disassembled after completion of the evaluation to observe the surface of the heater in the nozzle used in the ejection durability test through an optical microscope (400 magnifications), thereby evaluating the degree of kogation in accordance with the following standard:

A: Kogation was scarcely observed;

B: Kogation was slightly observed, but no practical problem was caused;

C: Kogation was observed to a great extent;

D: Kogation was observed to a very great extent.

TABLE 1

|  | Type of polyol phosphate | Vth (V) | r value | Vop (V) | Ejection durability | Degree of kogation |
|---|---|---|---|---|---|---|
| Ex. 1 | Disodium β-glycerophosphate pentahydrate 2.8 parts | 21.0 | 1.39 | 24.8 | A | A |
| Ex. 2 | Disodium β-glycerophosphate pentahydrate 2.8 parts | 21.1 | 1.10 | 22.1 | A | A |
| Ex. 3 | Disodium β-glycerophosphate pentahydrate 2.8 parts | 20.8 | 1.48 | 25.3 | A | A |
| Ex. 4 | Disodium β-glycerophosphate pentahydrate 2.8 parts | 20.8 | 1.56 | 26.0 | A | A |
| Ref. Ex. 1 | Disodium β-glycerophosphate pentahydrate 2.8 parts | 20.9 | 1.61 | 26.5 | B | B |
| Ref. Ex. 2 | Disodium β-glycerophosphate pentahydrate 2.8 parts | 21.1 | 1.69 | 27.4 | C | C |
| Comp. Ex. 1 | Not added | 21.0 | 1.39 | 24.8 | C | C |

TABLE 2

|  | Type of polyol phosphate | Coloring material | Vth (V) | r value | Vop (V) | Ejection durability | Degree of kogation |
|---|---|---|---|---|---|---|---|
| Ex. 5 | Dipotassium glucose-1-phosphate dihydrate 2 parts | Projet Fast Black 2 2 parts | 21.1 | 1.39 | 24.9 | A | A |
| Ex. 6 | Disodium α-glycerophosphate hexahydrate 2.8 parts | Projet Fast Black 2 2 parts | 20.9 | 1.39 | 24.6 | A | A |
| Ex. 7 | Disodium β-glycerophosphate pentahydrate 1 part | Projet Fast Yellow 2 3 parts | 20.9 | 1.39 | 24.6 | A | A |
| Ex. 8 | Disodium β-glycerophosphate pentahydrate 1 part | Projet Fast Magenta 2 3 parts | 20.8 | 1.39 | 24.5 | A | A |
| Ex. 9 | Disodium β-glycerophosphate pentahydrate 1 parts | Projet Fast Cyan 2 4 parts | 21.0 | 1.39 | 24.8 | A | A |
| Ex. 10 | Disodium β-glycerophosphate pentahydrate 10 parts | Projet Fast Black 2 2 parts | 21.1 | 1.39 | 24.9 | A | A |
| Ex. 11 | Disodium β-glycerophosphate pentahydrate 1 part | Carbon black 4.5 parts | 20.8 | 1.39 | 24.5 | A | A |
| Ex. 12 | Disodium β-glycerophosphate pentahydrate 1 part | Carbon black (COONa group was introduced) 3 parts | 21.0 | 1.39 | 24.8 | A | A |
| Ex. 13 | Disodium β-glycerophosphate pentahydrate 1 part | C.I. Pigment Yellow 93 4 parts | 21.1 | 1.39 | 24.9 | A | A |
| Ex. 14 | Disodium β-glycerophosphate pentahydrate 1 part | C.I. Pigment Red 122 4 parts | 20.9 | 1.39 | 24.6 | A | A |

TABLE 2-continued

| | Type of polyol phosphate | Coloring material | Vth (V) | r value | Vop (V) | Ejection durability | Degree of kogation |
|---|---|---|---|---|---|---|---|
| Ex. 15 | Disodium β-glycero-phosphate pentahydrate 1 part | C.I. Pigment Blue 15:3 4 parts | 21.0 | 1.39 | 24.8 | A | A |
| Comp. Ex. 2 | Not added | Projet Fast Black 2 2 parts | 20.7 | 1.39 | 24.4 | C | C |
| Comp. Ex. 3 | Not added | Projet Fast Yellow 2 3 parts | 21.0 | 1.39 | 24.8 | B | B |
| Comp. Ex. 4 | Not added | Projet Fast Magenta 2 3 parts | 21.1 | 1.39 | 24.9 | C | C |
| Comp. Ex. 5 | Not added | Projet Fast Cyan 2 4 parts | 20.8 | 1.39 | 24.5 | B | B |
| Comp. Ex. 6 | Not added | Projet Fast Black 2 4 parts | 20.9 | 1.39 | 24.6 | B | B |
| Comp. Ex. 7 | Not added | Carbon black 4.5 parts | 21.0 | 1.39 | 24.8 | B | B |
| Comp. Ex. 8 | Not added | Carbon black (COONa group was introduced) 3 parts | 21.1 | 1.39 | 24.9 | B | B |
| Comp. Ex. 9 | Not added | C.I. Pigment Yellow 93 4 parts | 21.3 | 1.39 | 25.1 | B | B |
| Comp. Ex. 10 | Not added | C.I. Pigment Red 122 4 parts | 21.1 | 1.39 | 24.9 | C | C |
| Comp. Ex. 11 | Not added | C.I. Pigment Blue 15:3 4 parts | 20.8 | 1.39 | 24.5 | C | C |

What is claimed is:

1. An ink for an ink-jet recording used with an ink-jet recording apparatus comprising an ink-jet recording head provided with a heater having an outermost protection layer comprising at least one of a metal and an oxide thereof, the ink-jet recording apparatus ejecting the ink by utilizing thermal energy, the ink comprising (a) colouring material;
(b) liquid medium; and
(c) at least one selected from the group consisting of polyolphosphates and salts thereof.

2. The ink according to claim 1, wherein the metal is tantalum.

3. The ink according to claim 1, wherein the metal oxide is tantalum oxide.

4. The ink according to claim 1, wherein the total amount of the element (c) ranges from 0.005 wt % to 20 wt % to the ink.

5. The ink according to claim 1, wherein the element (c) is at least one selected from α-glycerophosphoric acid, β-glycerophosphoric acid and a salt thereof.

6. The ink according to claim 5, wherein the salt is alkaline metal salt.

7. The ink according to claim 1, wherein the colouring material is an water soluble dye.

8. The ink according to claim 1, wherein the colouring material is pigment.

9. The ink according to claim 1, wherein the liquid medium contains water, the ink contains water in the range of from 35 to 96 wt %.

10. A method for alleviating scorch deposition on a surface of a heater of a recording head of an ink-jet recording apparatus, the heater being arranged to apply thermal energy to an ink in the recording head to eject the ink from an orifice of the recording head, and the heater having an outermost protection layer containing at least one selected from the group consisting of a metal and a metal oxide, wherein the ink comprises (a) a colouring material;
(b) a liquid medium; and
(c) at least one selected from the group consisting of polyolphosphates and salts thereof.

11. The method according to claim 10, wherein the metal is tantalum.

12. The method according to claim 10, wherein the metal oxide is tantalum oxide.

13. The method according to claim 10, wherein the total amount of the element (c) ranges from 0.005 wt % to 20 wt % to the ink.

14. The method according to claim 10, wherein the element (c) is at least one selected from α-glycerophosphoric acid, β-glycerophosphoric acid and a salt thereof.

15. The method according to claim 14, wherein the salt is alkaline metal salt.

16. The method according to claim 10, wherein the liquid medium contains water, the ink contains water in the range of from 35 to 96 wt %.

17. The method according to claim 10, wherein Eop, an energy amount applied to the heater to generate thermal energy to be applied to the ink, satisfies following equation:

$$1.10 \leq Eop/Eth \leq 1.60$$

in which Eth denotes a minimum energy amount to be applied to the heater necessary for ejecting the ink from the recording head.

18. An ink-jet recording method comprising the steps of:

applying pulse electric signals to a heater in an ink flow path according to recording signals, generating heat from the heater to heat ink in the ink flow path and ejecting ink from an orifice, wherein the ink comprises
(a) colouring material;
(b) liquid medium; and
(c) at least one selected from the group consisting of polyolphosphates and salts thereof.

19. The ink-jet recording method according to claim 18, wherein the total amount of the element (c) ranges from 0.005 wt % to 20 wt % to the ink.

20. The ink-jet recording method according to claim 18, wherein the element (c) is at least one selected from α-glycerophosphoric acid, β-glycerophosphoric acid and a salt thereof.

21. The ink-jet recording method according to claim 20, wherein the salt is alkaline metal salt.

22. The ink-jet recording method according to claim 18, wherein the liquid medium contains water, the ink contains water in the range of from 35 to 96 wt %.

23. The ink-jet recording method according to claim 18, wherein the heater is provided with an outermost protection layer comprising at least one selected from a group consisting of a metal and a metal oxide.

24. The ink-jet recording method according to claim 23, wherein the metal is tantalum.

25. The ink-jet recording method according to claim 23, wherein the metal oxide is tantalum oxide.

26. The ink-jet recording method according to claim 18, wherein Eop, an energy amount applied to the heater to generate thermal energy to be applied to the ink, satisfies following equation:

$$1.10 \leq Eop/Eth \leq 1.60$$

in which Eth denotes a minimum energy amount to be applied to the heater necessary for ejecting the ink from the head.

27. An ink-jet recording apparatus comprising:

an ink container containing an ink;

an ink-jet recording head having a heater for applying thermal energy to said ink within an ink flow path, said ink being fed from said ink container, and means for applying a pulsed electric signal in response to recording information, the heater being provided with an outermost protection layer containing at least one selected from a metal and a metal oxide, wherein the ink comprises
(a) colouring material;
(b) liquid medium; and
(c) at least one selected from the group consisting of polyolphosphates and salts thereof.

28. The ink-jet recording apparatus according to claim 27, wherein the metal is tantalum.

29. The ink-jet recording apparatus according to claim 27, wherein the metal oxide is tantalum oxide.

30. The ink-jet recording apparatus according to claim 27, wherein the total amount of the element (c) ranges from 0.005 wt % to 20 wt % to the ink.

31. The ink-jet recording apparatus according to claim 27, wherein the element (c) is at least one selected from α-glycerophosphoric acid, β-glycerophosphoric acid and a salt thereof.

32. The ink-jet recording apparatus according to claim 31, wherein the salt is alkaline metal salt.

33. The ink-jet recording apparatus according to claim 27, wherein Eop, an energy amount applied to the heater to generate thermal energy to be applied to the ink, satisfies following equation:

$$1.10 \leq Eop/Eth \leq 1.60$$

in which Eth denotes a minimum energy amount to be applied to the heater necessary for ejecting the ink from the recording head.

34. A recording unit comprising an ink container containing an ink, and an ink-jet recording head for ejecting the ink from an orifice by thermal energy, the ink-jet recording head having a heater for applying the thermal energy to the ink, and the heater being provided with an outermost protection layer comprising at least one selected from the group consisting of a metal and a metal oxide, wherein the ink comprises
(a) colouring material;
(b) liquid medium; and
(c) at least one selected from the group consisting of polyolphosphates and salts thereof.

35. The recording unit according to claim 34, wherein the metal is tantalum.

36. The recording unit according to claim 34, wherein the metal oxide is tantalum oxide.

37. The recording unit according to claim 34, wherein the total amount of the element (c) ranges from 0.005 wt % to 20 wt % to the ink.

38. The recording unit according to claim 34, wherein the element (c) is at least one selected from α-glycerophosphoric acid, β-glycerophosphoric acid and a salt thereof.

39. The recording unit according to claim 38, wherein the salt is alkaline metal salt.

40. A method for prolonging a life of a recording head equipped with a heater, the recording head being used in an ink-jet recording method comprising a step of ejecting an ink through an orifice by applying thermal energy to the ink with the heater, the heater being provided with an outermost protection layer comprising at least one selected from the group consisting of a metal and a metal oxide, wherein the ink comprises
(a) colouring material;
(b) liquid medium; and
(c) at least one selected from the group consisting of polyolphosphates and salts thereof.

41. The method according to claim 40, wherein the metal is tantalum.

42. The method according to claim 40, wherein the metal oxide is tantalum oxide.

43. The method according to claim 40, wherein the total amount of the element (c) ranges from 0.005 wt % to 20 wt % to the ink.

44. The method according to claim 40, wherein the element (c) is at least one selected from α-glycerophosphoric acid, β-glycerophosphoric acid and a salt thereof.

45. The method according to claim 40, wherein the salt is alkaline metal salt.

46. The method according to claim 40, wherein Eop, an energy amount applied to the heater to generate thermal energy to be applied to the ink, satisfies following equation:

$$1.10 \leq Eop/Eth \leq 1.60$$

in which Eth denotes a minimum energy amount to be applied to the heater necessary for ejecting the ink from the recording head.

47. An ink for ink-jet recording used with an ink-jet recording apparatus comprising an ink-jet recording head provided with a heater having an outermost protection layer comprising a metal or an oxide thereof, the ink-jet recording apparatus ejecting the ink by utilizing thermal energy, the ink comprising:
    (a) coloring material;
    (b) liquid medium; and
    (c) at least one compound selected from the group consisting of α-glycerophosphoric acid, a salt thereof, β-glycerophosphoric acid and a salt thereof.

48. A method for alleviating scorch deposition on a surface of a heater of a recording head of an ink-jet recording apparatus, the heater being arranged to apply thermal energy to an ink in the recording head to eject the ink from an orifice of the recording head, and the heater having an outermost protection layer containing a metal or a metal oxide, wherein the ink comprises:
    (a) a coloring material;
    (b) a liquid medium; and
    (c) at least one compound selected from the group consisting of α-glycerophosphoric acid, a salt thereof, β-glycerophosphoric acid and a salt thereof.

49. An ink-jet recording method comprising the steps of:
    applying pulse electric signals to a heater in an ink flow path according to recording signals;
    generating heat from the heater to heat ink in the ink flow path; and
    ejecting ink from an orifice, wherein the ink comprises:
        (a) coloring material;
        (b) liquid medium; and
        (c) at least one compound selected from the group consisting of α-glycerophosphoric acid, a salt thereof, β-glycerophosphoric acid and a salt thereof.

50. An ink-jet recording apparatus comprising:
    an ink container containing an ink;
    an ink-jet recording head having a heater for applying thermal energy to said ink within an ink flow path, said ink being fed from said ink container; and
    means for applying a pulsed electric signal in response to recording information, the heater being provided with an outermost protection layer containing a metal or a metal oxide; wherein the ink comprises:
        (a) coloring material;
        (b) liquid medium; and
        (c) at least one compound selected from the group consisting of α-glycerophosphoric acid, a salt thereof, β-glycerophosphoric acid and a salt thereof.

51. A recording unit comprising an ink container containing an ink, and an ink-jet recording head for ejecting the ink from an orifice by thermal energy, the ink-jet recording head having a heater for applying the thermal energy to the ink, and the heater being provided with an outermost protection layer comprising a metal or a metal oxide; wherein the ink comprises:
    (a) coloring material;
    (b) liquid medium; and
    (c) at least one compound selected from the group consisting of α-glycerophosphoric acid, a salt thereof, β-glycerophosphoric acid and a salt thereof.

52. A method for prolonging a life of a recording head equipped with a heater, the recording head being used in an ink-jet recording method comprising a step of ejecting an ink through an orifice by applying thermal energy to the ink with the heater, the heater being provided with an outermost protection layer comprising a metal or a metal oxide, wherein the ink comprises:
    (a) coloring material;
    (b) liquid medium; and
    (c) at least one compound selected from the group consisting of α-glycerophosphoric acid, a salt thereof, β-glycerophosphoric acid and a salt thereof.

* * * * *

UNITED STATES PATENT AND TRADEMARK OFFICE
CERTIFICATE OF CORRECTION

PATENT NO.      : 6,394,594 B1
DATED           : May 28, 2002
INVENTOR(S)     : Ryuji Katsuragi et al.

It is certified that error appears in the above-identified patent and that said Letters Patent is hereby corrected as shown below:

Column 2,
Line 53, "far" should read -- quite --.
Line 57, "$1.10 \leqq Eop/Eth < 1.60$." should read -- $1.10 \leqq Eop/Eth \leqq 1.60$. --.

Column 4,
Line 4, "ologosaccharides" should read -- oligosaccharides --.
Lines 6, 14 and 27, "β-glycero-phosphoric" should read -- β-glycerophosphoric --.

Column 8,
Line 40, "a electrical" should read -- an electrical --.
Line 47, "an" should read -- no --.
Line 59, "its" should be deleted.
Line 60, "more" should read -- further --.

Column 21,
Line 42, "comprising" should read -- comprising: --.
Lines 43, 59 and 61, "colouring" should read -- coloring --.
Line 52, "to the" should read -- of the --.
Line 60, "an" should read -- a --.

Column 22,
Line 40, "comprises" should read -- comprises: --.
Line 41, "colouring" should read -- coloring --.
Line 51, "to" should read -- of --.

Column 23,
Lines 5 and 52, "comprises" should read -- comprises: --.
Lines 6 and 53, "colouring" should read -- coloring --.
Lines 12 and 63, "to the" should read -- of the --.

UNITED STATES PATENT AND TRADEMARK OFFICE
CERTIFICATE OF CORRECTION

PATENT NO. : 6,394,594 B1
DATED : May 28, 2002
INVENTOR(S) : Ryuji Katsuragi et al.

It is certified that error appears in the above-identified patent and that said Letters Patent is hereby corrected as shown below:

<u>Column 24,</u>
Lines 21 and 49, "comprises" should read -- comprises: --.
Lines 22 and 50, "colouring" should read -- coloring --.
Lines 34 and 60, "to" should read -- of --.

Signed and Sealed this

First Day of July, 2003

JAMES E. ROGAN
*Director of the United States Patent and Trademark Office*